United States Patent
Makino et al.

[11] 4,128,598
[45] Dec. 5, 1978

[54] THERMOSETTING RESIN COMPOSITIONS HAVING EXCELLENT HIGH TEMPERATURE CHARACTERISTICS

[75] Inventors: Kiyoji Makino, Yokosuka; Tsutomu Ohkawa, Yokohama, both of Japan

[73] Assignee: Toshiba Chemical Products Co. Ltd., Tokyo, Japan

[21] Appl. No.: 809,769

[22] Filed: Jun. 24, 1977

[30] Foreign Application Priority Data

Jun. 25, 1976 [JP] Japan ................... 51-75096

[51] Int. Cl.$^2$ ............... C08L 63/02; C08L 63/00
[52] U.S. Cl. ..................... 260/837 R; 260/37 EP; 260/830 P; 260/836; 427/185; 428/260; 428/413; 428/415; 428/416; 528/102; 528/98
[58] Field of Search .......... 260/830 P, 47 EN, 2 N, 260/836, 77.5 NC, 837 R, 78 SC, 78 UA, 59 EP

[56] References Cited

U.S. PATENT DOCUMENTS

| | | | |
|---|---|---|---|
| 3,409,590 | 11/1968 | Landua et al. ................. | 260/47 |
| 3,637,901 | 1/1972 | Bargain et al. ................. | 260/830 P |
| 3,755,253 | 8/1973 | Rice ............................... | 260/47 EN |
| 3,998,904 | 12/1976 | Balme et al. ................... | 260/830 R |

*Primary Examiner*—Theodore E. Pertilla
*Attorney, Agent, or Firm*—Oblon, Fisher, Spivak, McClelland & Maier

[57] ABSTRACT

Thermosetting resin compounds produced by polymerizing together bismaleimide expressed by the general structural formula:

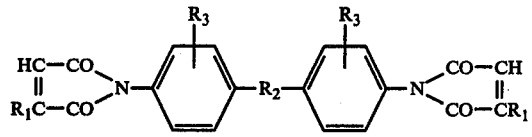

where:
$R_1$ is hydrogen or alkyl group,
$R_2$ is —O—, —$CH_2$—, —$SO_2$— or —S—S—, and
$R_3$ is hydrogen, alkyl group or chlorine;

aminophenol expressed by the general structural formula:

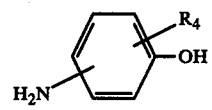

where $R_4$ is hydrogen, halogens or alkyl group;
a specified epoxy compound; and imidazole which is expressed by the general structural formula:

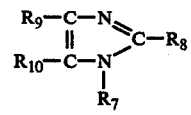

where $R_7$ to $R_{10}$ are hydrogen or alkyl group and $R_7$ and $R_8$ may be benzyl or phenyl, and which may be added, if necessary.

7 Claims, No Drawings

THERMOSETTING RESIN COMPOSITIONS HAVING EXCELLENT HIGH TEMPERATURE CHARACTERISTICS

BACKGROUND OF THE INVENTION

This invention relates to thermosetting resin compounds excelling in heat resistance, electric insulation, mechanical strength and workability, Known thermosetting resins include epoxy resin, phenolic resin, silicone resin and polyester resin. However, none of these conventional thermosetting resins are satisfactory in respect of high temperature characteristics. For instance, it is known that epoxy resin declines in mechanical strength at higher temperature from 100° C. and is deteriorated at a temperature of about 180° C. to fall in electric insulation. In contrast, resins based on maleimide such as polyaminobismaleimide is known to have a prominent heat resistance. However, resins of maleimide series have the drawbacks that bismaleimides have a high melting point, are little soluble in an ordinary organic solvent with the resultant low workability, and require high temperature and long hours for hardening.

SUMMARY OF THE INVENTION

It is accordingly an object of this invention to provide thermosetting resin compositions having prominent heat resistance, electric insulation and mechanical strength at high temperatures.

Another object of the invention is to provide thermosetting resin compositions adapted for application such as impregnation in a base material, molding or powder coating.

Thermosetting resin compositions of the invention are essentially produced by polymerizing together at least one bismaleimide compound expressed by the general structural formula:

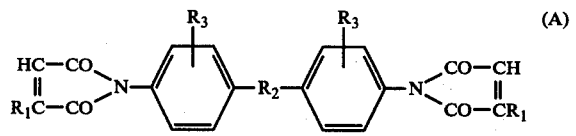

where:
- $R_1$ is, the same or different, hydrogen or alkyl group having one or two carbon atoms,
- $R_2$ is —O—, —CH$_2$—, —SO$_2$— or —S—S—, and
- $R_3$ is, the same or different, hydrogen, alkyl group having one or two carbon atoms or chlorine;

at least one aminophenol compound expressed by the general structural formula:

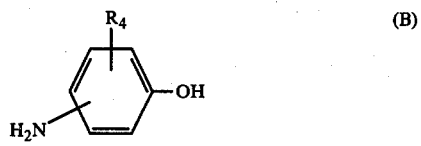

where $R_4$ is hydrogen, halogens or alkyl group having one or two carbon atoms; and at least one epoxy compound selected from the group consisting of a compound expressed by the general structural formula:

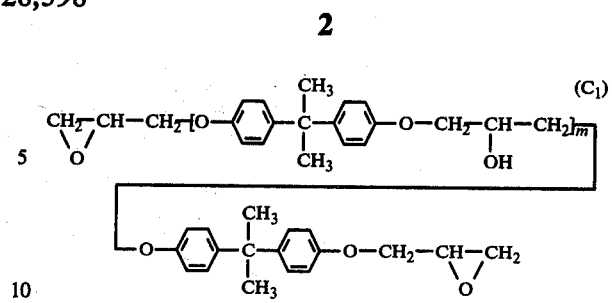

where $m$ is 0 or an integer of 1 to 4, a compound expressed by the general structural formula:

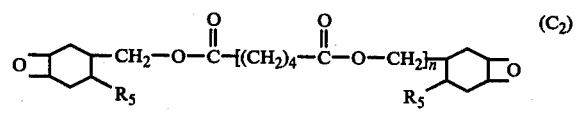

where $n$ is 0 or 1, and $R_5$ is, the same or different, hydrogen or methyl, a compound expressed by the general structural formula:

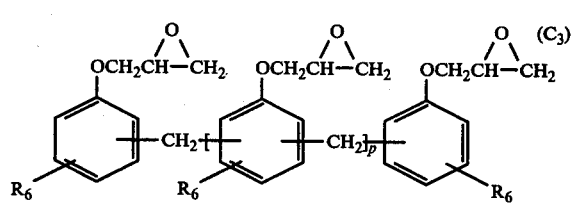

where $p$ is 0, 1 or 2, and $R_6$ is, the same or different, hydrogen, bromine or methyl, and a compound expressed by the general structural formula:

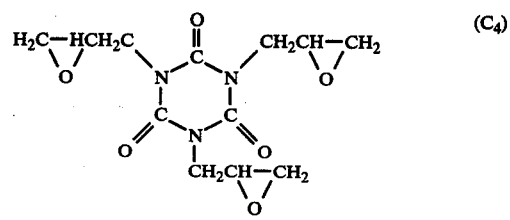

If necessary, it is possible to add at least one imidazole expressed by the general structural formula:

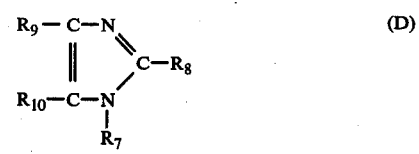

where $R_7$ and $R_{10}$ are, the same or different, hydrogen or alkyl group having one or two carbon atoms, and $R_7$ and $R_8$ may be benzyl or phenyl. A thermosetting resin composition essentially formed of a polymeric reaction product containing the above-mentioned imidazole is preferred due to hardening time being decreased.

DETAILED DESCRIPTION OF THE PREFERRED EMBODIMENTS

The bismaleimide expressed by the general structural formula (A) preferably includes 4,4'-methylene-bis-(N-phenylmaleimide), 4,4'-oxy-bis-(N-phenylmaleimide), 4,4'-sulfone-bis-(N-phenylmaleimide), 4,4'-dithio-bis-(N-phenylmaleimide), 4,4'-methylene-bis-(N-3-chlorophenylmaleimide) and 4,4'-methylene-bis-(N-2-methylphenylmaleimide). Particularly preferred is 4,4'-methylene-bis-(N-phenylmaleimide).

Aminophenol expressed by the general structural formula (B) preferably include O-aminophenol, m-aminophenol, p-aminophenol, 2-amino-4-chlorophenol, 2-amino-4-methylphenol and 2-amino-4-ethylphenol.

Epoxy compounds available for use with this invention include aromatic epoxy compounds of the bisphenol type, and epoxy compounds of the novolak type. However, practically usable epoxy compounds include those expressed by the general structural formulas ($C_1$) to ($C_4$). Preferred epoxy compound of the ($C_1$) type is "Epikote" commercially manufactured by Shell International Chemicals Corp. of England. Epoxy compound of the ($C_2$) type includes "CHISSONOX" commercially manufactured by Chisso Co. of Japan. Epoxy compound of the ($C_3$) type includes novolak type "DEN" commercially manufactured by Dow Chemicals Corp. of U.S.A. and bromophenol novolak type "BREN" commercially manufactured by Nippon Kayaku Co. Ltd. of Japan. Epoxy compound of the ($C_4$) type includes "TEPIC" commercially manufactured by Nissan Chemical Industries, Ltd. of Japan. Application of the epoxy compound of the ($C_4$) type provides more heat-resistant thermosetting resin compositions.

Imidazole expressed by the general structural formula (D) include 2-methylimidazole, 2-ethyl-4-methylimidazole, 2-phenylimidazole and 1-benzyl-2-methylimidazole.

According to the present invention, it is advised to prepare thermosetting resin compositions by mixing at proper temperature the above-mentioned bismaleimide, aminophenol, epoxy resin and, if necessary, imidazole. No limitation is imposed on the order in which these components are mixed. Namely, the components may be mixed at the same time. The temperature at which said mixing is undertaken is preferred to be about 100° to 140° C. Under this condition, the components are melted together to promote polymeric reaction to a certain extent.

Another process of this invention of preparing thermosetting resin compositions is first to mix bismaleimide and aminophenol at a temperature of 100° to 120° C. to provide an addition product. In this case, it is preferred to add 0.2 to 2 mols of aminophenol per mol of bismaleimide. The addition product thus obtained not only has its melting point decreased to a lower level than 100° C., but also is fully soluble in a low boiling solvent such as acetone, methylethyl ketone and dioxane, presenting prominent workability in manufacturing thermosetting resin composition and also putting said compositions to practical applications. The above-mentioned addition product (which may be solved in a solvent or not) is mixed with epoxy compound and, if necessary, imidazole at a temperature of about 100° to 140° C. It is preferred to mix 30 to 80% by weight of the addition product of bismaleimide and aminophenol with 70 to 20% by weight of epoxy compound. Smaller proportions of the addition product than 30% by weight results in insufficient heat-resistance and larger proportions of said addition product than 80% by weight leads to a lower mechanical strength. A mixture of the addition product and epoxy resin of low viscosity provides a liquid resin composition having a viscosity of about 1 centipoise at a temperature of 50° C. This liquid resin composition has been found to be an extremely desirable solventless impregnating agent.

Imidazole used as an optional additive promotes the hardening of the resin. Addition of imidazole is generally preferred to be 0.1 to 5% by weight. The resin composition of this invention containing imidazole has the advantage of being hardened in a shorter time and at a slightly lower temperature than that which lacks imidazole.

Obviously, it is possible, as is well known in the particular field, to add many other additives such as organic or inorganic fillers, pigments, stabilizers, and mold-releasing agents to the thermosetting resin composition according to its intended application. The fillers concretely include powders of calcium carbonate, silica powders, clay powders, quartz powders, alumina powders, powders of calcium hydroxide, asbestos powders, graphite powders and glass fibers. Addition of these fillers is preferred to be 25 to 80% by weight based on the thermosetting resin composition.

The thermosetting resin composition of this invention can be effectively used as an impregnating agent, molding agent and powder coating agent.

Where the subject thermosetting resin composition is applied as a solvent-containing impregnating agent, the aforesaid addition product of bismaleimide and aminophenol is dissolved in a solvent such as acetone, or methylethyl ketone. The mass is mixed with epoxy compound, imidazole, if necessary, and other required additives at a proper temperature by means of dissolution. Where the subject thermosetting resin composition is used as a solventless impregnating agent, the aforesaid addition product, low molecular epoxy compound, imidazole, if necessary, and required additives are mixed together at a proper temperature. An impregnating material formed of a resin composition thus prepared is impregnated in a base material such as glass cloth, cotton cloth or paper. A plurality of the resultant prepreg sheets are laminated and heated under a pressure at a temperature of 160° C. to 200° C. to provide suitable electric insulating material.

Where used as molding material, the subject thermosetting resin composition is finally crushed or cut up into fine chips, as customarily practised. Where applied as powder coating material, the thermosetting resin composition is previously pulverized into fine particles having a proper size. Where mixed with a filler such as glass fiber, the thermosetting resin composition is preferred to form varnish-like molding material by being dissolved in any of the previously described solvents. The thermosetting resin composition are hardened at a temperature of 160° to 200° C. If cured thereafter 2 to 10 hours at a temperature of 180° to 220° C., the resultant molding will be more elevated in mechanical strength at high temperature.

A thermosetting resin composition prepared by the method of this invention prominently excells is not only electric insulation and mechanical strength, but also in workability during manufacture of an article.

This invention will be more fully understood by reference to the examples which follow. Throughout the examples, percent is by weight, unless particularly noted.

EXAMPLE 1

1 mol of 4,4'-methylene-bis-(N-phenylmaleimide) was mixed with 2 mols of m-aminophenol. When heated to 100° C. with stirring, the mixture was uniformly dissolved, providing a brown liquid. The liquid was heated 1 hour at 120° C. The liquid obtained by subjecting the bismaleimide and aminophenol to through addition reaction was dissolved in a solvent of methylethyl ketone to form a 50% solution. 50g of epoxy resin (Epikote 828) was added to 100g of said solution (that is, 50g of the resultant resin). The mass was stirred to provide a uniformly mixed solution. Glass cloth treated with aminosilane was dipped in the solution to be impregnated therewith. The impregnated glass cloth was dried 10 minutes in a drier at 100° C. and then 10 minutes in the drier later heated to 150° C. A number of the impregnated glass clothes were molded by being compressed 30 minutes at a pressure of 40 kg/cm² in a press heated to 170° C., providing a transparent reddish brown laminate board.

The laminate board after-cured 2 hours at 220° C. was tested for bending strength in conformity to the procedure specified in ASTM D790-66. The test bending strength indicated 61 kg/mm² at room temperature, 56 kg/mm² at 150° C., 45 kg/mm² at 220° C. and 54 kg/mm² at room temperature even after the tested sample was heated 500 hours at 250° C.

EXAMPLE 2

An addition product of bismaleimide and aminophenol (having a softening point of 95° C.) was prepared in substantially the same manner as in Example 1, excepting that 0.2 mol of p-aminophenol was used in place of 2 mols of m-aminophenol. 50g of epoxy resin (CHISSONOX 221) was added to 50g of the addition product. Mixing was carried out at 100° C. to form a homogeneous liquid, which indicated a viscosity of 1 centipoise at 50° C. A laminate board was prepared from the liquid in substantially the same manner as in Example 1, excepting that the laminate board was hardened 5 hours at 170° C. and further after-cured 5 hours at 200° C. The laminate board indicated an excellent dielectric tangent of 0.002 at room temperature, 0.008 at 100° C., 0.012 at 150° C. and 0.019 at 200° C. After heated 500 hours at 250° C., the laminate board indicated a weight loss of only 5.8%. When tested for bending strength by the same procedure as in Example 1, the laminate board gave similar results.

EXAMPLE 3

An addition product of 1 mol of 4,4'-oxy-bis-(N-phenylmaleimide) and 0.5 mol of 2-amino-4-chlorophenol was provided in the same manner as in Example 1. The addition product had a softening point of 102° C. A very transparent reddish brown laminate board was obtained from the addition product through the same process as in Example 1. The laminate board after-cured 2 hours at 220° C. was tested for bending strength by the same procedure as in Example 1. The tested bending strength indicated 59 kg/mm² at room temperature, 55 kg/mm² at 150° C., 45 kg/mm² at 200° C. and 50 kg/mm² at room temperature even after the tested sample was heated 500 hours at 250° C.

EXAMPLES 4 and 5

1 mol of 4,4'-methylene-bis-(N-phenylmaleimide) and 1 mol of m-aminophenol were mixed with stirring at 100° C., providing a homogeneous brown liquid. The liquid was kept 30 minutes at 120° C. to complete addition reaction. The addition product was dissolved in a solvent of methylethyl ketone to form a 50% solution. A 100g sample of the solution, 35g of epoxy resin (DEN-438) and 0.3g of 2-ethyl-4-methylimidazole were mixed together with stirring, providing a homogeneous solution (Example 4). Another 100g sample of the solution, 25g of epoxy resin (TEPIC) and 0.25g of 2-methylimidazole were mixed with stirring providing a homogeneous solution (Example 5). A laminate board was prepared from each of these solutions in the same manner as in Example 1. The laminate boards after-cured 2 hours at 220° C. were tested for bending strength by the same procedure as in Example 1, the results being set forth in Table 1.

Table 1

| Test conditions | Bending Strength (unit: kg/mm²) | |
| --- | --- | --- |
| | Example 4 | Example 5 |
| Room temperature | 60 | 63 |
| 150° C | 56 | 59 |
| 200° C | 48 | 52 |
| Room temperature after heated 500 hours at 250° C | 57 | 59 |

EXAMPLE 6

1 mol of 4,4'-methylene-bis-(N-phenylmaleimide) and 1 mol of m-aminophenol were mixed in a kneader at 100° C., providing a viscous liquid. The liquid was kept 10 minutes at a temperature of 100° to 120° C. and was mixed with 1 mol of epoxy resin (DEN-438), 600g of graphite powder and 10g of 2-ethyl-4-methylimidazole. After heated 140° C. in about 10 minutes, the mixed mass was cooled and crushed. The crushed sample was subjected 6 minutes to compression molding in a metal mold at 180° C., providing a product having an attractive appearance. The molding after-cured 10 hours at 200° C. was tested for physical properties, the results being presented in Table II below.

EXAMPLE 7

A molding was prepared in substantially the same manner as in Example 6, excepting that there were used epoxy resin of Epikote 828, calcium carbonate powder as a filler and 2-methylimidazole as a hardening catalyst. The molding after-cured 10 hours at 200° C. was tested for physical properties, the results being given in Table II below.

EXAMPLE 8

1 mol of 4,4'-dithio-bis-(N-phenylmaleimide) and 0.7 mol of 2-amino-4-methylphenol were mixed in a kneader at 100° C., providing an addition product having a softening point of 95° C. 100g of the addition product was mixed with 50g of epoxy resin (DEN-438) at 120° C. Thereafter 0.5g of 2-ethyl-4-methylimidazole was added. After mixing was continued 5 minutes, the mass was cooled and crushed. The crushed sample was compression molded 4 minutes in a metal mold at 180° C. The molding after-cured 1 hour at 200° C. was tested for bending strength by the procedure specified in ASTM D790-66. The tested bending strength indicated 9.5 kg/mm² at room temperature, 7.5 kg/mm² at 200° C., and 8.0 kg/mm² at room temperature even after the sample was heated 300 hours at 250° C.

EXAMPLE 9

1 mol of 4,4'-oxy-bis-(N-phenylmaleimide) and 1 mol of 2-amino-4-methylphenol were mixed in a kneader at 100° C., providing a viscous liquid. The liquid was kept 10 minutes at a temperature of 100° C. to 120° C. and mixed with 0.7 mol of epoxy resin (TEPIC) and 39g of 2-ethyl-4-methylimidazole. After heated to 140° C. in 20 minutes, the mass was cooled and crushed, providing a powdery thermosetting resin composition of 80 to 300 mesh.

The powdery resin composition was fluidized by air introduced from the bottom of a fluidizer. A steel plate 3mm thick heated to 180° C. was dipped 10 seconds in the fluidized streams of the powdery resin composition. The steel plate thus treated was dried 60 minutes at 200° C. Then a hardened film 30 microns thick on average was formed on the surface of the steel plate. The impact strength of the coated film was measured to be 23cm when tested by the Du Pont type impact tester (load 500g; the size of impact center ¼ inch). When heated 300 hours at 200° C., the film indicates a weight loss of 5.6%.

What is claimed is:

1. A thermosetting resin composition which is essentially prepared from a polymeric reaction product obtained by mixing an addition product of at least one bismaleimide compound expressed by the general structural formula:

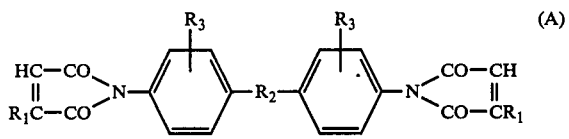

where:
$R_1$ is, the same or different, hydrogen or alkyl group having one or two carbon atoms,
$R_2$ is —O—, —CH$_2$—, —SO$_2$— or —S—S—, and
$R_3$ is, the same or different, hydrogen, chlorine or alkyl group having one or two carbon atoms; and at least one aminophenol compound expressed by the general structural formula:

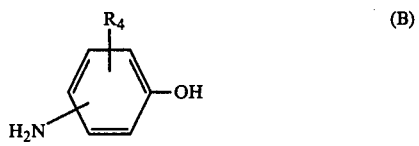

where $R_4$ is hydrogen, halogens, or alkyl group having one or two carbon atoms, wherein said addition product is formed of from 0.2 to 2 mols of said aminophenol per mol of said bismaleimide; with at least one epoxy compound selected from the group consisting of a compound expressed by the general structural formula:

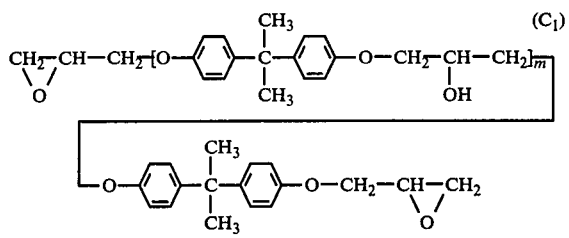

where $m$ is 0 or an integer of 1 to 4, a compound expressed by the general structural formula:

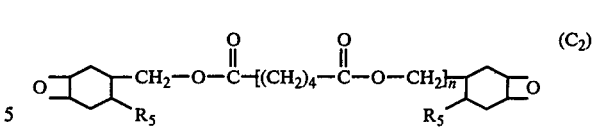

where:
$n$ is 0 or 1, and
$R_5$ is, the same or different, hydrogen or methyl, a compound expressed by the general structural formula:

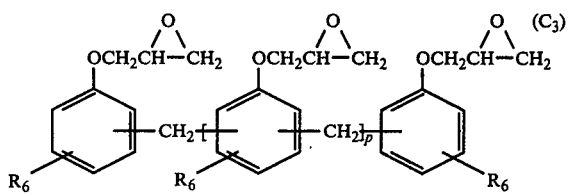

where:
$p$ is 0, 1 or 2, and
$R_6$ is, the same or different, hydrogen, bromine or methyl, and a compound expressed by the general structural formula:

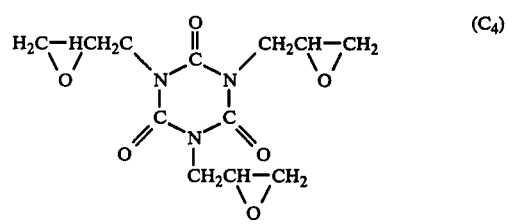

2. The thermosetting resin composition according to claim 1, which further contains at least one imidazole compound expressed by the general structural formula:

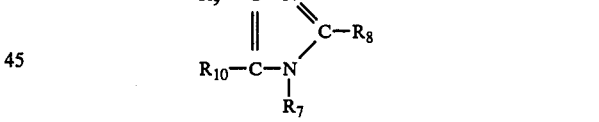

where $R_7$ to $R_{10}$ are, the same or different, hydrogen or alkyl group having one or two carbon atoms, and $R_7$ and $R_8$ may be benzyl or phenyl.

3. The thermosetting resin composition according to claim 1, wherein the bismaleimide expressed by the general structural formula (A) is at least one selected from the group consisting of 4,4'-methylene-bis-(N-phenylmaleimide), 4,4'oxy-bis-(N-phenylmaleimide), 4,4'-sulfone-bis-(N-phenylmaleimide), 4,4'-dithio-bis-(N-phenylmaleimide), 4,4'-methylene-bis-(N-3-chlorophenyleimide) and 4,4'-methylene-bis-(N-2-methylphenyl-maleimide).

4. The thermosetting resin composition according to claim 1, wherein the aminophenol expressed by the general structural formula (B) is at least one selected from the group consisting of o-aminophenol, m-aminophenol, p-aminophenol, 2-amino-4-chlorophenol, 2-amino-4-methylphenol and 2-amino-4-ethylphenol.

5. The thermosetting resin composition according to claim 2, wherein the imidazole expressed by the general structural formula (D) is at least one selected from the group consisting of 2-methylimidazole, 2-ethyl-4-methylimidazole, 2-phenylimidazole and 1-benzyl-2-methylimidazole.

6. The thermosetting resin composition according to claim 1, which is essentially prepared from a polymeric reaction product of bismaleimide expressed by the general structural formula (A) and aminophenol expressed by the general structural formula (B) with 70 to 20% by weight of at least one of said epoxy compound expressed by the general structural formulas ($C_1$) to ($C_4$).

7. The thermosetting resin composition according to claim 2, wherein the imidazole expressed by the general structural formula (D) is added in an amount corresponding to 0.1 to 5% by weight of the thermosetting resin composition.

* * * * *